United States Patent
Smith et al.

(10) Patent No.: US 10,473,112 B2
(45) Date of Patent: Nov. 12, 2019

(54) GAS TURBINE ENGINE FAN BLADE

(71) Applicant: ROLLS ROYCE plc, London (GB)

(72) Inventors: Nigel H S Smith, Derby (GB); Mark J. Wilson, Nottingham (GB); Gabriel Gonzalez-Gutierrez, Derby (GB); Marco Barale, Derby (GB); Benedict Phelps, Derby (GB); Kashmir S. Johal, Derby (GB)

(73) Assignee: Rolls-Royce plc, London (GB)

( * ) Notice: Subject to any disclaimer, the term of this patent is extended or adjusted under 35 U.S.C. 154(b) by 117 days.

(21) Appl. No.: 15/894,240

(22) Filed: Feb. 12, 2018

(65) Prior Publication Data
US 2018/0231018 A1   Aug. 16, 2018

(30) Foreign Application Priority Data
Feb. 14, 2017   (GB) .................................. 1702382.1

(51) Int. Cl.
*F04D 29/38*   (2006.01)
*F02K 3/06*   (2006.01)

(52) U.S. Cl.
CPC .............. *F04D 29/384* (2013.01); *F02K 3/06* (2013.01); *F04D 29/388* (2013.01); *F05D 2220/32* (2013.01); *F05D 2240/301* (2013.01); *F05D 2240/303* (2013.01)

(58) Field of Classification Search
CPC ...... F04D 29/384; F04D 29/388; F01D 5/141; F01D 5/26; F02K 3/06; F05D 2220/32; F05D 2220/36; F05D 2240/301; F05D 2240/303; Y02T 50/672; Y02T 50/673
See application file for complete search history.

(56) References Cited

U.S. PATENT DOCUMENTS

| | | | |
|---|---|---|---|
| 7,112,043 B2 | 9/2006 | Jarrah | |
| 7,497,664 B2* | 3/2009 | Walter | F01D 5/141 416/223 A |
| 8,057,188 B2 | 11/2011 | Parker et al. | |
| 8,087,884 B2* | 1/2012 | Wood | F01D 5/141 415/191 |
| 9,011,081 B2* | 4/2015 | Gomez | F01D 5/141 415/151 |

(Continued)

FOREIGN PATENT DOCUMENTS

| | | |
|---|---|---|
| EP | 1754859 | 2/2007 |
| EP | 1840336 | 10/2007 |

(Continued)

OTHER PUBLICATIONS

Great Britain Search Report issued in GB Patent Application No. 1702380.5 dated Apr. 20, 2017.

(Continued)

*Primary Examiner* — David E Sosnowski
*Assistant Examiner* — Sang K Kim
(74) *Attorney, Agent, or Firm* — Duane Morris LLP

(57) ABSTRACT

A fan blade is provided with an aerofoil portion for which, at radii between 20% and 40% of the blade span, the location of the position of maximum thickness along the camber line is at less than a defined percentage of the total length of the camber line. For all cross-sections through the aerofoil portion at radii greater than 70% of the blade span, the location of the position of maximum thickness along the camber line is at more than a defined percentage of the total length of the camber line. The geometry of the fan blade may result in a lower susceptibility to flutter.

20 Claims, 5 Drawing Sheets

(56) References Cited

U.S. PATENT DOCUMENTS

| | | |
|---|---|---|
| 2006/0165520 A1 | 7/2006 | Guemmer |
| 2010/0054946 A1 | 3/2010 | Orosa et al. |
| 2014/0165592 A1 | 6/2014 | Key |
| 2014/0341749 A1 | 11/2014 | Perrot et al. |
| 2014/0356159 A1 | 12/2014 | Heikurinen et al. |
| 2016/0194962 A1* | 7/2016 | Cojande .................. F01D 5/141 415/208.1 |
| 2018/0371918 A1* | 12/2018 | Liskiewicz ............. F01D 5/141 |

FOREIGN PATENT DOCUMENTS

| | | |
|---|---|---|
| EP | 1930599 | 6/2008 |
| EP | 2080909 | 7/2009 |
| EP | 2423436 | 2/2012 |
| EP | 2476862 | 7/2012 |
| EP | 2631491 | 8/2013 |
| EP | 3061914 | 8/2016 |
| GB | 2164098 | 3/1986 |

OTHER PUBLICATIONS

Great Britain Search Report issued in GB Patent Application No. 1702382.1 dated Apr. 21, 2017.
Great Britain Search Report issued in GB Patent Application No. 1702383.9 dated Apr. 20, 2017.
Great Britain Search Report issued in GB Patent Application No. 1702384.7 dated Apr. 19, 2017.

* cited by examiner

SECTION A-A

SECTION B-B

GAS TURBINE ENGINE FAN BLADE

CROSS-REFERENCE TO RELATED APPLICATIONS

This specification is based upon and claims the benefit of priority from UK Patent Application Number 1702382.1 filed on 14 Feb. 2017, the entire contents of which are incorporated herein by reference.

BACKGROUND

1. Field of the Disclosure

This disclosure relates to a fan blade for a gas turbine engine, a fan stage comprising at least one such fan blade, and a gas turbine engine comprising such a fan stage.

2. Description of the Related Art

Modern gas turbine aero-engines typically comprise a fan, which compresses the incoming air and directs at least a portion of that air along a bypass duct, with the remainder of the air flowing through the engine core. The fan blades of such gas turbine engines may be susceptible to a known phenomenon called flutter. Flutter may occur at certain engine operating conditions, for example certain rotational speeds and/or thrusts and/or combinations thereof.

Flutter may be characterized as a self-excited vibration. When the aerofoils in a blade row (such as the fan blades in a gas turbine engine fan) vibrate, they generate unsteady aerodynamic forces on the blade row itself. Under most conditions, these unsteady aerodynamic forces cause the blade row to do work on the surrounding air, and the vibrations decay in amplitude. However, at certain operational conditions, the surrounding air can do work on the fan itself. If the work done by the air exceeds the work dissipated by mechanical damping, then the vibrations will grow. This instability is known as flutter.

Modern large gas turbine engines are being designed to have lower specific thrust and higher fan tip loading than their predecessors. This may be achieved by driving the fan via a gearbox in order to reduce the rotational speed of the fan. Lower specific thrust and/or lower rotational speed and/or higher tip loading may be beneficial from an efficiency perspective, but may present significant operability challenges.

For example, as the cruise and sea level working lines separate at lower pressure ratios, the challenge to have sufficient stall and flutter margins relative to the sea level static (SLS) working line, and acceptable cruise working line efficiency becomes more difficult.

Accordingly, the design of modern turbofan gas turbine engines tends to increase the susceptibility of fan blades to experience flutter. Flutter is undesirable because it can generate large stresses in an engine.

Accordingly, it would be desirable to be able to reduce the susceptibility of the fan blades in an engine to flutter.

SUMMARY

According to an aspect, there is provided a fan blade for a gas turbine engine, the gas turbine engine defining axial, radial and circumferential directions. The fan blade comprises an aerofoil portion having a leading edge extending from a root to a tip, the radial distance between the leading edge at the root and the leading edge at the tip defining a blade span. For cross-sections through the aerofoil portion at radii between 20% and 40% of the blade span from the root radius, the average location of the position of maximum thickness along the camber line is at less than 45% of the total length of the camber line from the leading edge. For cross-sections through the aerofoil portion at radii greater than 70% of the blade span from the root radius, the average location of the position of maximum thickness along the camber line is at more than 50% of the total length of the camber line from the leading edge.

By way of example, for cross-sections through the aerofoil portion at radii between 15% or 20% and 40% or 45% of the blade span from the root radius, the average location of the position of maximum thickness along the camber line may be less than 35%, in the range of from 35% to 50%, for example 40% to 45%, for example on the order of 42%, of the total length of the camber line from the leading edge. For example, for cross-sections through the aerofoil portion at radii between 20% and 40% of the blade span from the root radius, the average location of the position of maximum thickness along the camber line may be at less than 42% of the total length of the camber line from the leading edge.

By way of example, for cross-sections through the aerofoil portion at radii greater than 65%, for example 75% or greater, of the blade span from the root radius, the average location of the position of maximum thickness along the camber line may be in the range of from 55% to 80%, for example 60% to 70%, for example on the order of 65% of the total length of the camber line from the leading edge. Thus, for example, for cross-sections through the aerofoil portion at radii greater than 70% of the blade span from the root radius, the average location of the position of maximum thickness along the camber line may be at more than 55% of the total length of the camber line from the leading edge.

As used herein, where the average location of the position of maximum thickness is said to be at greater (or less) than a given percentage of the total length of the camber line over a certain range of radii, this may mean that the position of maximum thickness is greater (or less) than that given percentage of the total length of the camber line for all cross-sections over that entire range of radii. Alternatively, where the average location of the position of maximum thickness is said to be at greater (or less) than a given percentage of the total length of the camber line over a certain range of radii, the position of maximum thickness may not necessarily be greater (or less) than that given percentage of the total length of the camber line for all cross-sections over that entire range of radii.

As used herein, the thickness of an aerofoil section may be defined at a given location on the camber line as the length of a line that is perpendicular to the local direction of the camber line at that location and extends from the pressure surface to the suction surface.

Reference to a cross-section through an aerofoil at a given percentage along the blade span may mean a section through the aerofoil in a plane defined by: a line that passes through the point on the leading edge that is at that percentage along the leading edge from the leading edge root and points in the direction of the tangent to the circumferential direction at that point on the leading edge; and a point on the trailing edge that is at that same percentage along the trailing edge from the trailing edge root.

As referred to herein, the percentage along the leading edge or trailing edge from the root may be, for example a radial percentage or a spanwise percentage.

Alternatively, reference to a cross-section through an aerofoil at a given radial percentage along the blade span may mean a section through the aerofoil that is perpendicular to the radial direction at that radial percentage along the leading edge.

Where reference is made to the axial, radial and circumferential directions, the skilled person will readily understand this to mean the conventional directions when the fan blade is assembled as part of a fan stage or is provided in a gas turbine engine. Viewing the blade along a circumferential direction may mean viewing the blade in side profile and/or in the meridional plane and/or projected onto a plane defined by the axial and radial directions.

Without being bound by any particular theory, the present inventors have understood that the susceptibility of a blade to flutter may depend at least in part on the frequency and mode shape of the first vibration mode of the blade. For example, in general a higher first modal frequency may reduce fan blade susceptibility to flutter. The inventors have developed blades and/or aerofoil portions of blades as described and/or claimed herein in order to reduce the susceptibility to flutter. This may be achieved, for example, by adopting the thickness distribution as described and/or claimed herein, which may be said to increase the thickness in certain regions of the blade relative to previous blades.

Again without being bound by particular theory, it is suggested that for some blades biasing the thickness distribution as described and/or claimed herein (which may be described as biasing the thickness distribution more towards the trailing edge of the blade towards the radially outer portion compared with a conventional blade) may reduce the amount of torsion in the first modal frequency mode. This may be because in the radially outer portion of the blade the leading edge region has higher kinetic energy in the first vibration mode, and so biasing the mass (or thickness) towards the trailing edge in this radially outer portion (for example compared with conventional blades) may tend to increase the first modal frequency.

By providing a blade that is less susceptible to flutter, it may be possible, for example, to operate a gas turbine engine comprising such blades in a more efficient engine cycle.

As used herein, a leading edge thickness of the blade may be defined as the thickness of a cross-section at a given radius at a location along the camber line that is 8% of the total length of the camber line from the leading edge.

In some arrangements, for cross-sections through the aerofoil portion at radii between 15% and 25% of the blade span from the root radius, the average leading edge thickness may be greater than the leading edge thickness at the tip, for example greater than 1.5 times the leading edge thickness at the tip.

As used herein, the leading edge thickness at the tip may be defined as the average leading edge thickness for all cross-sections through the aerofoil portion at radii greater than 80% of the blade span.

In some arrangements, for all cross-sections through the aerofoil portion at radii between 15% and 25% of the blade span from the root radius, the leading edge thickness may be greater than the leading edge thickness at the tip, for example greater than 1.5 times the leading edge thickness at the tip.

Leading edge thickness distributions as described and/or claimed herein may be generally relatively thicker than conventional blades at radii between 15% and 25% of the blade span relative to the leading edge thickness at the tip. This may further decrease the susceptibility of the blade to flutter, for example by stiffening the leading edge of the blade, which may result in a higher first mode natural frequency and/or reduced torsional content in the first mode.

The fan blade may comprise a platform. The fan blade may comprise a root portion. The root portion may extend between the platform and the root of the aerofoil portion. Alternatively, the aerofoil portion may extend directly from the platform, with no intermediate root portion, such that the root of the aerofoil foil portion is the root of the fan blade.

Where the fan blade comprises a root portion, the radial extent of the root portion may be no more than 15% for example no more than 10%, 7%, 5%, 3%, 2% or 1%, of the span of the aerofoil portion, for example.

The fan blade may comprise a tip portion that extends at least radially away from the tip of the aerofoil portion. Alternatively, the fan blade may comprise no tip portion, such that the tip of the aerofoil portion is also the tip of the fan blade.

Where the fan blade comprises a tip portion, the radial extent of the tip portion may be no more than 15%, for example no more than 10%, 7%, 5%, 3%, 2% or 1%, of the span of the aerofoil portion, for example.

Any fan blade and/or aerofoil portion described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre, and/or from a metal, such as a titanium based metal or an aluminium based material (such as an Aluminium-Lithium alloy) or a steel based material.

According to an aspect, there is provided a fan stage for a gas turbine engine comprising a plurality of fan blades as described and/or claimed herein. The fan stage may comprise a hub, from which the fan blades may extend, for example in a radial direction.

Such a hub may be, or may comprise, a fan disc and/or may be driven by a shaft. The shaft itself may be driven by a turbine of a gas turbine engine.

The fan blades may be attached to the hub in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc.

By way of further example, the fan blades may be formed integrally with a hub. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

By way of further example, the fan blades may be attached to a hub in a manner that allows their pitch to be varied.

In any arrangement of fan stage, the ratio of the radius of the position where the leading edge of one of the fan blades meets the hub to the outermost radial extent of the leading edge of the fan blade is less than 0.4, for example less than 0.37, for example less than 0.35, for example less than 0.33, for example less than 0.3, for example less than 0.25. This may be referred to as the hub-to-tip ratio and/or may be the same as the ratio of the radius of the root at the leading edge of the aerofoil portion to the radius of the tip at the leading edge of the aerofoil portion, for example where the fan blade is not provided with a root portion or a tip portion. The hub-to-tip ratio refers, of course, to the gas-washed portion of the fan blade, i.e. the portion radially outside any platform.

According to an aspect, there is provided a gas turbine engine comprising at least one fan blade as described and/or claimed herein and/or a fan stage as described and/or claimed herein.

Such a gas turbine engine (which may, of course, be a turbofan gas turbine engine) may have a specific thrust of less than 15 lbf/lb/s (or approximately 150 N/Kg/s), for example less than 12 lbf/lb/s (or approximately 120 N/Kg/s), for example less than 10 lbf/lb/s (or approximately 110 N/Kg/s or 100 N/Kg/s), for example less than 9 lbf/lb/s (or approximately 90 N/Kg/s), for example less than 8.5 lbf/lb/s (or approximately 85 N/Kg/s), for example less than 8 lbf/lb/s (or approximately 80 N/Kg/s).

Any gas turbine engine described and/or claimed herein may have a fan tip loading ($dH/U_{tip}^2$) at cruise conditions of greater than 0.3, for example in the range of from 0.3 to 0.37, for example 0.32 to 0.36, for example on the order of 0.35 (all units being $JKg^{-1}K^{-1}/(ms^{-1})^2$), where dH is the enthalpy rise across the fan (for example the 1-D average enthalpy rise of the flow across the fan at cruise conditions), and $U_{tip}$ is the velocity of the tip, for example at cruise conditions, which may be calculated as the rotational speed multiplied by the tip radius at the leading edge. Cruise may be defined as the phase between the initial ascent and final descent of an aircraft to which the engine may be attached. As used herein, cruise may mean, for example, mid-cruise, i.e. mid-point (for example in terms of time and/or fuel burn) of a flight (or at least of the cruise phase of a flight).

The radius of the fan may be measured between the engine centreline and the tip of a fan blade at its leading edge. The fan diameter (which may simply be twice the radius of the fan) may be greater than 250 cm, for example greater than 260 cm, 270 cm, 280 cm, 290 cm, 300 cm, 310 cm, 320 cm, 330 cm, 340 cm or 350 cm.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than 10, for example greater than 11, for example greater than 11.5, for example greater than 12, for example greater than 13, for example greater than 14, for example greater than 15. The bypass duct may be substantially annular. The bypass duct may be radially outside the core engine. The radially outer surface of the bypass duct may be defined by a nacelle and/or a fan case.

A gas turbine engine as described and/or claimed herein may have any desired maximum thrust. Purely by way of non-limitative example, a gas turbine as described and/or claimed herein may be capable of producing at least 170 kN of thrust, for example at least 180 kN, for example at least 190 kN, for example at least 200 kN, for example at least 250 kN, for example at least 300 kN, for example at least 350 kN, for example at least 400 kN. The thrust referred to above may be at standard atmospheric conditions.

Such a gas turbine engine may be of any suitable form. For example, the gas turbine engine may be an aero gas turbine engine for use on aircraft. Such an engine may be a geared turbofan gas turbine engine, in which the fan stage is driven from a turbine via a gearbox, in order to reduce (or increase) the rotational speed of the fan stage compared with the driving turbine stage(s).

The arrangements of the present disclosure may be particularly effective in addressing any operability issues presented by the use of such lower speed fans, such as those driven via a gearbox.

The input to such a gearbox may be directly from a core shaft that connects a turbine to a compressor, or indirectly from the core shaft, for example via a spur shaft and/or gear. The core shaft may rigidly connect the turbine and the compressor, such that the turbine and compressor rotate at the same speed (with the fan rotating at a lower speed).

Any number of fan stages may be provided to an engine. For example, a gas turbine engine may have a single fan stage, such that the next downstream rotor stage after the fan is a compressor rotor stage, for example a compressor rotor stage in the core of the engine.

The skilled person will appreciate that except where mutually exclusive, a feature described in relation to any one of the above aspects may be applied to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
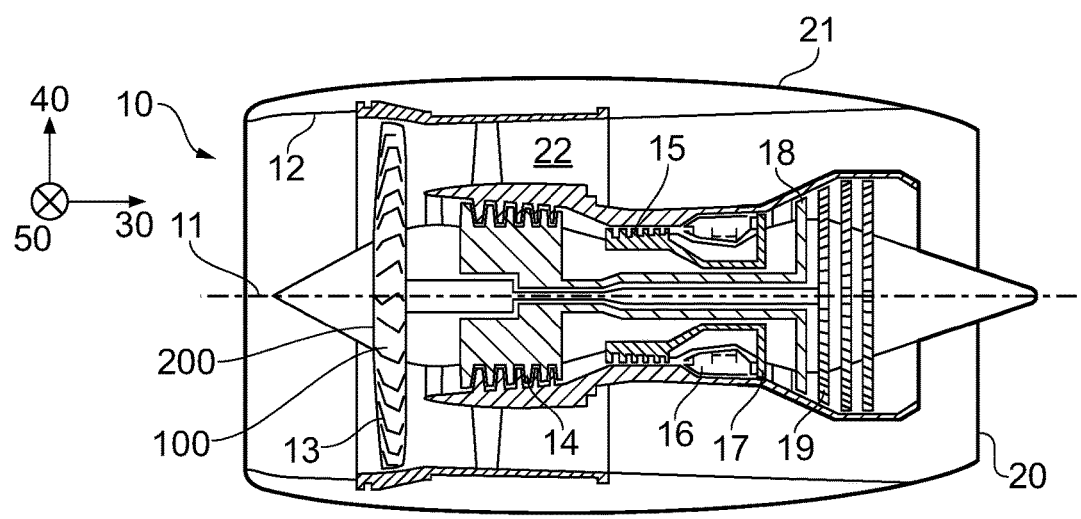
FIG. 1 is a sectional side view of a gas turbine engine on accordance with the present disclosure.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The gas turbine engine 10 and/or the fan stage 13 and/or the fan blades 100 of the fan stage 13 shown in FIG. 1 may be in accordance with examples of the present disclosure, aspects of which are described by way of example only in relation to FIGS. 2 to 5.

Any gas turbine engine in accordance with the present disclosure (such as the gas turbine engine 10 of FIG. 1) may, for example, have a specific thrust in the ranges described herein (for example less than 10) and/or a fan blade hub to tip ratio in the ranges described herein and/or a fan tip loading in the ranges described herein.

The present disclosure may relate to any suitable gas turbine engine. For example, other gas turbine engines to which the present disclosure may be applied may have related or alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan. The gas turbine engine shown in FIG. 1 has a mixed flow nozzle 20, meaning that the flow through the bypass duct 22 and the flow through the core 15, 16, 17, 18, 19 are mixed, or combined, before (or upstream of) the nozzle 20). However, this is not limiting, and any aspect of the present disclosure may also, for example, relate to engines 10 having a split flow nozzle, which may mean that the flow through the bypass duct 22 has its own nozzle that is separate to and may be radially outside a core engine nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction 30 (which is aligned with the rotational axis 11), a radial direction 40, and a circumferential direction 50 (shown perpendicular to the page in the FIG. 1 view). The axial, radial and circumferential directions 30, 40, 50 are mutually perpendicular.

The fan stage 13 comprises a plurality of fan blades 100 extending from a hub 200. The fan blades 100 may be defined with respect to the axial direction 30, radial direction 40, and circumferential direction 50 shown in FIG. 1 in relation to the gas turbine engine 10.

Figure 2:
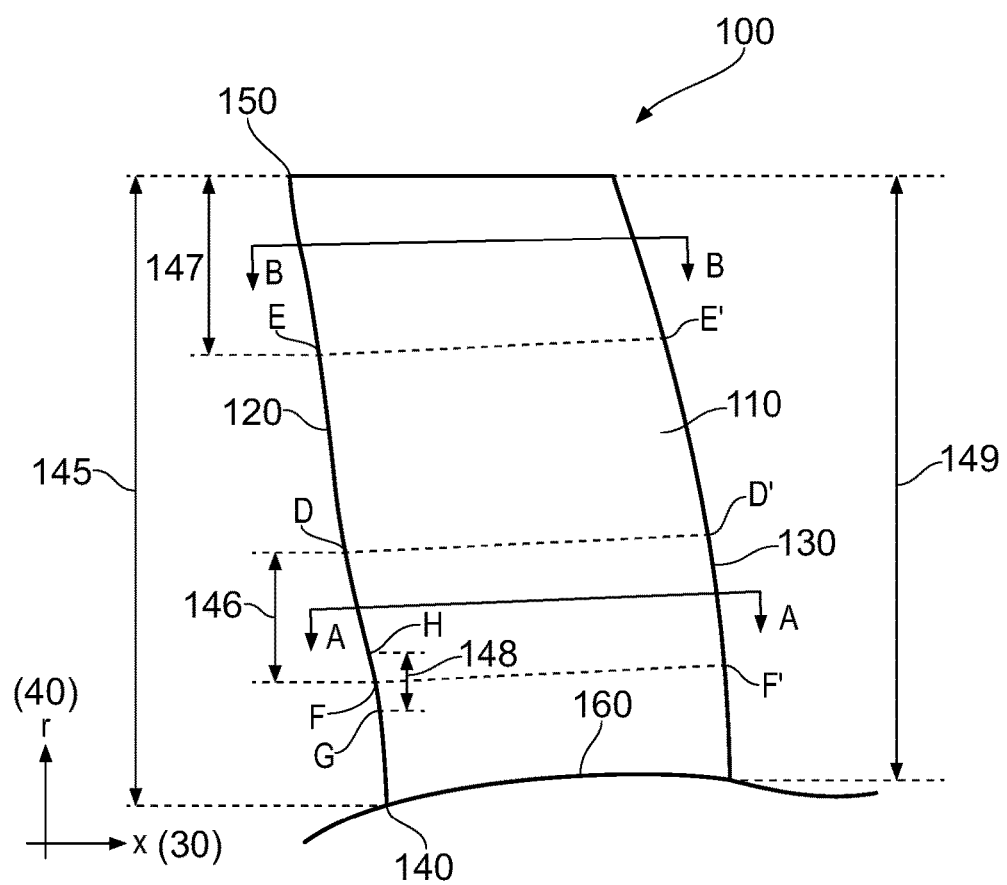
FIG. 2 is a side view of a fan blade according to an example of the present disclosure.

FIG. 2 is a side view (that is, a view in the axial-radial plane) of the fan blade 100. The fan blade 100 has an aerofoil portion 110. The aerofoil portion 110 has a leading edge 120 and a trailing edge 130. The aerofoil portion 110 extends from a root 140 to a tip 150 in a substantially radial spanwise direction. The leading edge 110 may be defined as the line defined by the axially forwardmost points of the aerofoil portion 110 from its root 140 to its tip 150.

A radial span 145 is defined as the distance in the radial direction 40 between the leading edge 120 at the root 140 and the leading edge 120 at the tip 150. The radius of the leading edge 120 at the root 140 may be referred to as the root radius. The radius of the leading edge 120 at the tip 150 may be referred to as the tip radius. A trailing edge span 149 may be defined between the trailing edge 130 at the root 140 and the tip 150.

A radial extent 146 is shown schematically in FIG. 2 representing the region between a point F at a radius of 20% of the blade span 145 from the root radius and a point D at a radius of 40% of the blade span 145 from the root radius. The corresponding points at the same respective percentages along the trailing edge span 149 are marked as F' and D'. A cross section A-A through the aerofoil portion 110 within the radial extent labelled 146 is indicated by arrows A-A in FIG. 2, and shown in FIG. 4. The cross-section A-A passes through a point that is between 20% and 40% of the blade span 145 from the leading edge root and a point that is the same percentage of the trailing edge span 149 from the trailing edge root.

A radial extent 147 is shown schematically in FIG. 2 representing the region at a radius greater than 70% of the blade span 145 from the root radius, with the point at a radius of 70% of the blade span 145 from the leading edge root radius being labelled as point E. The corresponding point at a radius of 70% of the trailing edge span 149 from the trailing edge root radius is labelled as point E'. A cross section B-B through the aerofoil portion 110 within the radial extent labelled 147 is indicated by arrows B-B in FIG. 2, and shown in FIG. 5. The cross-section B-B passes through a point that is greater than 70% of the blade span 145 from the leading edge root and a point that is the same percentage of the trailing edge span 149 from the trailing edge root.

It will be appreciated that cross-sections through the blade (for example cross-sections A-A or B-B) may or may not be perpendicular to the radial direction, for example depending on the relative shapes and/or extents of the leading edge 120 and the trailing edge 130.

A radial extent 148 is shown schematically in FIG. 2 representing the region between a point G at a radius of 15% of the blade span 145 from the root radius and a point H at a radius of 25% of the blade span 145 from the root radius.

The fan blade 100 comprises a platform 160. The aerofoil portion 110 may extend directly from the platform 160, as in the FIG. 2 example. Alternatively, as shown by way of example in FIG. 3, a fan blade 100 may have a root portion 170. The root portion 170 may be said to extend between the platform 160 and the root 140 of the aerofoil portion 110. The radial extent of the root portion 170 may be no more than 7%, for example no more than 5%, of the span of the aerofoil portion 110.

Figure 3:
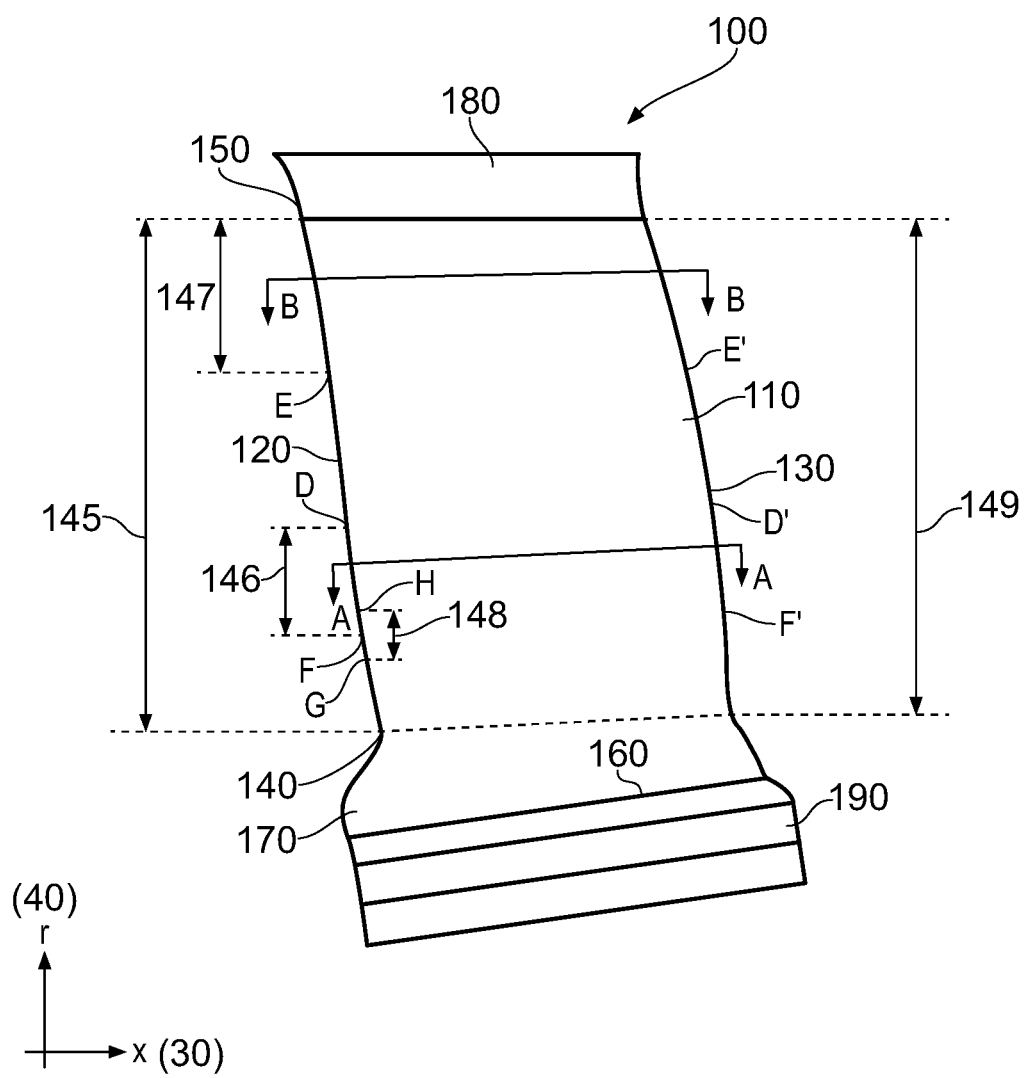
FIG. 3 is another side view of a fan blade according to an example of the present disclosure.

Also as shown by way of example in FIG. 3, the fan blade 100 may comprise a tip portion 180. The tip portion 180 may be said to extend from the tip 150 of the aerofoil portion 110. The radial extent of the tip portion 180 may be no more than 5% of the span of the aerofoil portion 110.

As shown in FIG. 3, regardless of the whether the fan blade 100 comprises a root portion 170 and/or a tip portion 180, the blade span 145 (and the trailing edge blade span 149) is defined between the root 140 and the tip 150 of the aerofoil. Similarly, the regions 146, 147 described above in relation to FIG. 2 are also defined in relation to the blade span 145 defined between the root 140 and the tip 150, regardless of whether the blade 100 comprises a root portion 170 and/or a tip portion 180. The cross-sectional locations A-A in the region 146 and B-B in the region 147 are also shown in FIG. 3.

Figure 4:
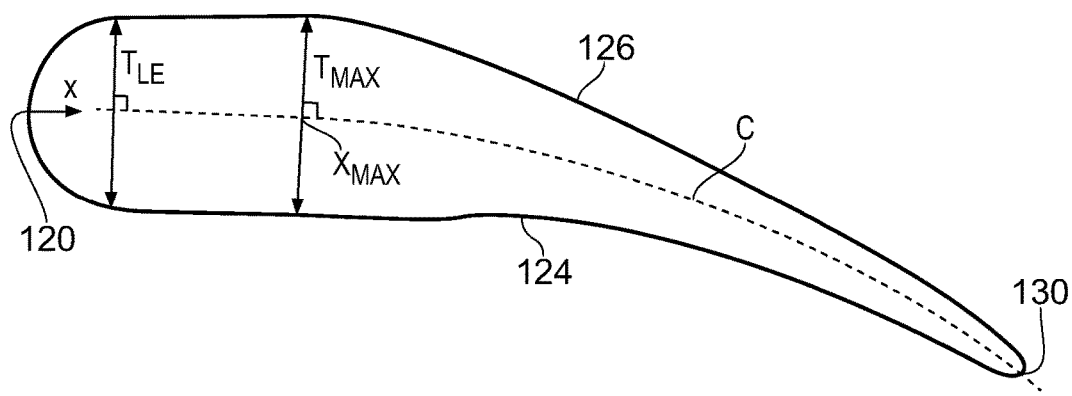
FIG. 4 is a cross-sectional view through a fan blade according to an example of the present disclosure.
Figure 5:
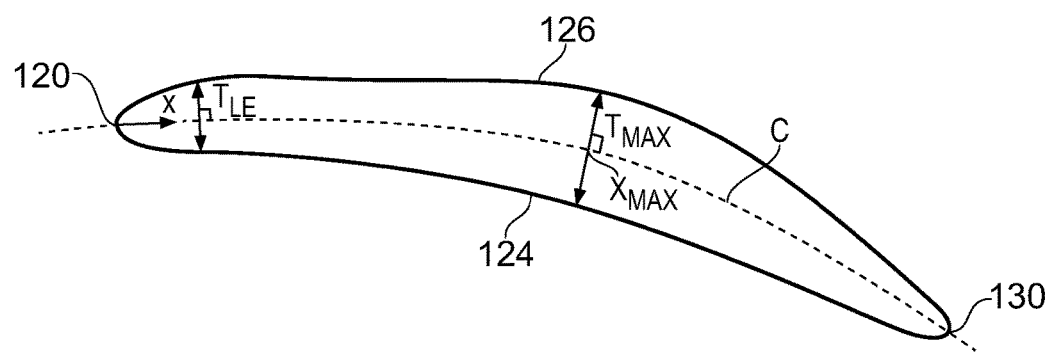
FIG. 5 is another cross-sectional view through a fan blade according to an example of the present disclosure.

As noted above, FIG. 4 shows the cross-section A-A defined herein, and FIG. 5 shows the cross-section B-B also defined herein. Both cross-sections have a camber line C (which may alternatively be referred to as a mean line). The camber line C may be defined as a line formed by the points equidistant from the pressure surface 124 and the suction surface 126. The distance along the camber line C from the leading edge 120 is indicated by the letter x in FIGS. 4 and 5. The total length of the camber line C is the length of the dashed line between the leading edge 120 and the trailing edge 130.

The thickness T at a given position x along the camber line C may be defined as the length of a line that is perpendicular to the camber line C at the location x and extends from the pressure surface 124 to the suction surface 126.

In the cross-section A-A (defined elsewhere herein), the position $x_{max}$ of maximum thickness $T_{max}$ along the camber line C may be in the range of from 35% to 50%, for example 40% to 45%, for example less than 45%, for example on the order of 42%, of the total length of the camber line C from the leading edge 120, as illustrated schematically in FIG. 4. These values may refer to the average position $x_{max}$ of maximum thickness $T_{max}$ in the region 146 between points G and D and/or to the position $x_{max}$ of maximum thickness $T_{max}$ for all cross sections in the region 146 between points G and D.

In the cross-section B-B (defined elsewhere herein), the position $x_{max}$ of maximum thickness $T_{max}$ along the camber line C may be greater than 55%, for example in the range of from 55% to 80%, for example 60% to 70%, for example on the order of 65% of the total length of the camber line C from the leading edge 120, as illustrated schematically in FIG. 5. These values may refer to the average position $x_{max}$ of maximum thickness $T_{max}$ in the region 147 between point E and the tip 150 and/or to the position $x_{max}$ of maximum thickness $T_{max}$ for all cross sections in the region 147 between point E and the tip 150.

Figure 6:
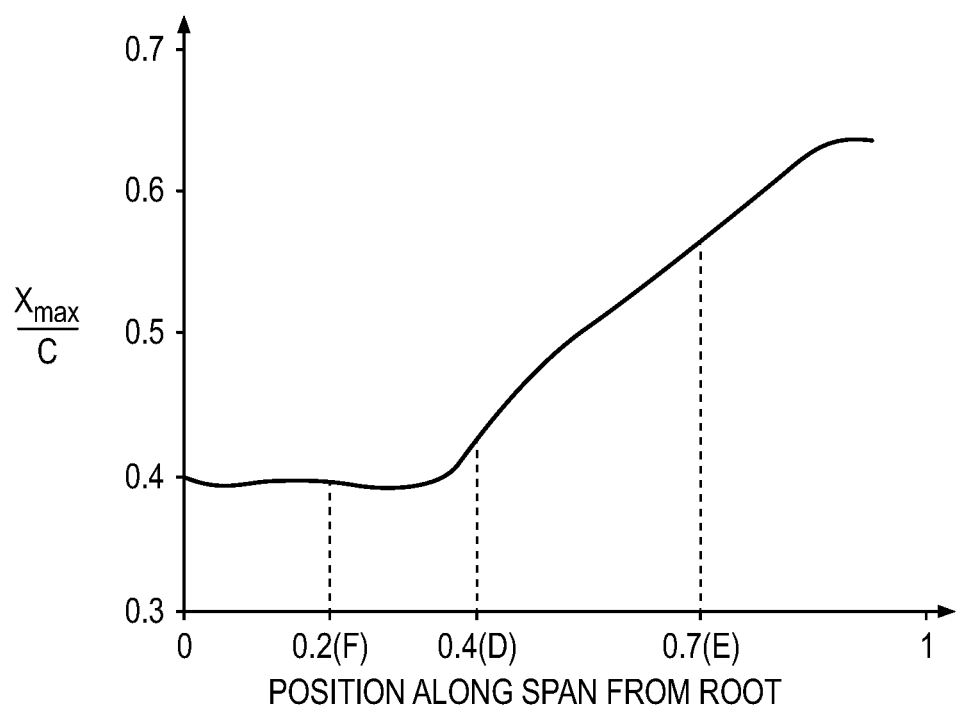
FIG. 6 is a schematic graph showing an example of the position of maximum thickness of a cross-section against position along the blade span for a fan blade according to an example of the present disclosure.

FIG. 6 is a graph showing an example of the position $x_{max}$ of maximum thickness $T_{max}$ along the camber line C (with "C" as used on the y-axis representing the total length of the camber line). In the FIG. 6 example, for the region between points F and D (i.e. for radii between 20% and 40% of blade span 145 from the root), the location (for all cross-sections and/or as an average) of the position of maximum thickness along the camber line is less than about 0.42 (or 42%) of the total length of the camber line. Also in the FIG. 6 example, for the region radially outside point E (i.e. for radii greater than 70% of blade span 145 from the root), the location (for all cross-sections and/or as an average) of the position of maximum thickness along the camber line is greater than about 0.55 (or 55%) of the total length of the camber line. It will be appreciated that the geometry represented by the graph in FIG. 6 is exemplary only, and a great many other geometries are possible in accordance with the present disclosure.

Both FIGS. 4 and 5 have the thickness of the leading edge indicated as $T_{LE}$. $T_{LE}$ is the thickness of an aerofoil section at a given radius at a position along the camber line that is 8% of the total length of the camber from the leading edge. This definition is used in order to be sufficiently far from the leading edge 120 itself to avoid the influence of the leading edge curvature (which may be, for example, an ellipse shape) on the thickness.

Figure 7:
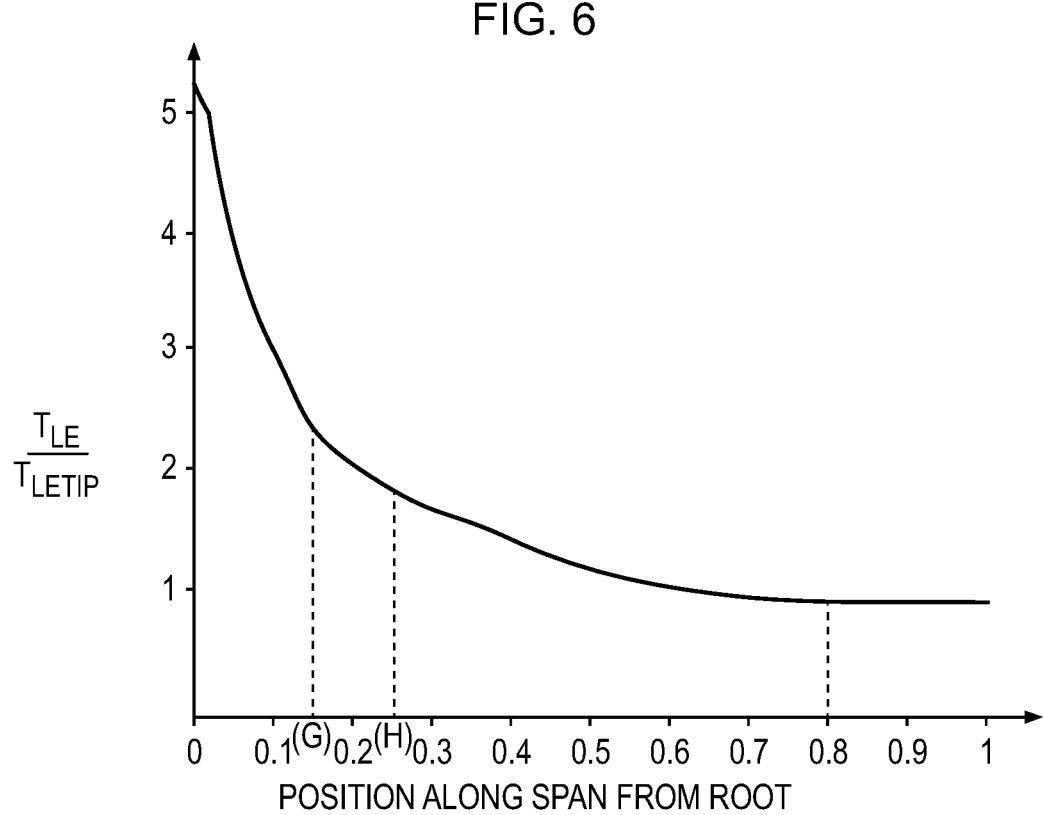
FIG. 7 is a schematic graph showing an example of the ratio between the leading edge thickness at a particular position along the blade span and the leading edge thickness at the tip against the position along the blade span for a fan blade according to an example of the present disclosure.

FIG. 7 is a graph showing an example of the ratio of the leading edge thickness ($T_{LE}$) at a given radial position to the leading edge thickness ($T_{LE}$) at the tip, where the average leading edge thickness at the tip is defined as the average leading thickness for all cross-sections through the aerofoil portion at radii greater than 80% of the blade span 145. In the FIG. 7 example, the leading edge thickness ($T_{LE}$) at radii between about 15% (indicated by letter G in FIGS. 2, 3 and 7) and about 25% (indicated by letter H in FIGS. 2, 3 and 7) of the blade span 145 from the root radius is greater than the leading edge thickness ($T_{LE}$) at the tip (as defined elsewhere herein). Indeed, in the FIG. 7 example, the leading edge thickness ($T_{LE}$) at radii between about 15% (indicated by letter G in FIGS. 2, 3 and 7) and about 25% (indicated by letter H in FIGS. 2, 3 and 7) of the blade span 145 from the root radius is at least 1.5 times, and indeed at least 2 times, the leading edge thickness ($T_{LE}$) at the tip. It will be appreciated that the geometry represented by the graph in FIG. 7 is exemplary only, and a great many other geometries are possible in accordance with the present disclosure. Indeed, the geometry of some examples in accordance with the present disclosure may not be in accordance with the leading edge thickness distribution shown in FIG. 7, which shows an exemplary, optional, distribution.

As explained elsewhere herein, the blade geometry described and/or claimed herein may reduce the susceptibility of the blades to flutter.

The fan blade 100 may be attached to the hub 200 in any desired manner. For example, the fan blade 100 may comprise a fixture 190 such as that shown by way of example in FIG. 3 which may engage a corresponding slot in the hub (or disc). Purely by way of example, such a fixture may be in the form of a dovetail that may slot into and/or engage a corresponding slot in the hub/disc in order to fix the fan blade to the hub/disc.

Alternatively, the fan blade 100 and the hub 200 may be formed as a unitary part, with no mechanical and/or releasable connections, so as to form a unitary fan stage 13. Such a unitary fan stage 13 may be referred to as a "blisk". Such a unitary fan stage 13 may be manufactured in any suitable manner, for example by machining and/or by linear friction welding the fan blades 100 to the hub 200, or at least linear friction welding the aerofoil portions 110 to a hub 200 that includes radially inner stub portions of the fan blades 100. The hub to tip ratio, which may have a value as indicated elsewhere herein, may be defined as the radius of the leading edge 120 at the root 140 (which may itself be referred to as a hub) of the aerofoil 110 divided by the radius of the leading edge 120 at the tip 150 of the aerofoil 110.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fan blade for a gas turbine engine, the gas turbine engine defining axial, radial and circumferential directions, the fan blade comprising:
    an aerofoil portion having a leading edge extending from a root to a tip, the radial distance between the leading edge at the root and the leading edge at the tip defining a blade span, wherein:
    for cross-sections through the aerofoil portion at radii between 20% and 40% of the blade span from a root radius, an average of the location of a position of maximum thickness (Tmax) along a camber line of each section is at less than 45% of a total length of the camber line from the leading edge; and
    for cross-sections through the aerofoil portion at radii greater than 70% of the blade span from the root radius, the average of the location of the position of maximum thickness (Tmax) along the camber line of each section is at more than 50% of the total length of the camber line from the leading edge.

2. The fan blade according to claim 1, wherein:
for cross-sections through the aerofoil portion at radii between 20% and 40% of the blade span from the root radius, the average of the location of the position of maximum thickness (Tmax) along the camber line of each section is at less than 42% of the total length of the camber line from the leading edge.

3. The fan blade according to claim 1, wherein:
for cross-sections through the aerofoil portion at radii greater than 70% of the blade span (145) from the root radius, the average of the location of the position of maximum thickness (Tmax) along the camber line of each section is at more than 55% of the total length of the camber line from the leading edge.

4. The fan blade according to claim 1, wherein for all cross-sections through the aerofoil portion at radii between 20% and 40% of the blade span from the root radius, the location of the position of maximum thickness (Tmax) along the camber line is at less than 45% of the total length of the camber line from the leading edge.

5. The fan blade according to claim 1, wherein for all cross-sections through the aerofoil portion at radii greater than 70% of the blade span from the root radius, the location of the position of maximum thickness (Tmax) along the camber line is at more than 50% of the total length of the camber line from the leading edge.

6. The fan blade according to claim 1, wherein:
a leading edge thickness (TLE) is defined as the thickness of a cross-section at a given radius at a location along the camber line that is 8% of the total length of the camber line from the leading edge; and
for cross-sections through the aerofoil portion at radii between 15% and 25% of the blade span from the root radius, the average leading edge thickness is greater than the leading edge thickness at the tip, where:
the leading edge thickness at the tip is defined as the average leading edge thickness for all cross-sections through the aerofoil portion at radii greater than 80% of the blade span.

7. The fan blade according to claim 6, wherein for all cross-sections through the aerofoil portion at radii between 15% and 25% of the blade span from the root radius, the leading edge thickness (TLE) is greater than the leading edge thickness at the tip.

8. The fan blade according to claim 6, wherein for cross-sections through the aerofoil portion at radii between 15% and 25% of the blade span from the root radius, the average leading edge thickness (TLE) is greater than 1.5 times the leading edge thickness at the tip.

9. The fan blade according to claim 6, wherein for all cross-sections through the aerofoil portion at radii between 15% and 25% of the blade span from the root radius, the leading edge thickness (TLE) is greater than 1.5 times the leading edge thickness at the tip.

10. The fan blade for a gas turbine engine according to claim 1, wherein the fan blade comprises:
a platform; and
a root portion, wherein:
the root portion extends between the platform and the root of the aerofoil portion, and the radial extent of the root portion is optionally no more than 7% of the aerofoil span.

11. The fan blade for a gas turbine engine according to claim 1, wherein the fan blade comprises a tip portion that extends at least radially away from the tip of the aerofoil portion.

12. A fan stage for a gas turbine engine comprising:
a hub; and
a plurality of fan blades according to claim 1, wherein:
the fan blades extend radially form the hub.

13. A gas turbine engine comprising the fan blade according to claim 1.

14. A gas turbine engine comprising the fan stage according to claim 12.

15. A gas turbine engine comprising:
a fan having a plurality of fan blades according to claim 1;
a turbine; and
a gearbox, wherein:
the fan is driven from the turbine via the gearbox, in order to reduce the rotational speed of the fan stage compared with the driving turbine stage.

16. The gas turbine engine according to claim 14 wherein:
the specific thrust is less than 100 N/Kg/s; or
the ratio of the radius of the position where the leading edge of one of the fan blades meets the hub to the outermost radial extent of the leading edge of the fan blade is less than 0.33.

17. The gas turbine engine according to claim 15 wherein:
the specific thrust is less than 100 N/Kg/s; or
the ratio of the radius of the position where the leading edge of one of the fan blades meets the hub to the outermost radial extent of the leading edge of the fan blade is less than 0.33.

18. The fan blade for a gas turbine engine according to claim 11, wherein the radial extent of the tip portion is no more than 7% of the span of the aerofoil portion.

19. The gas turbine engine according to claim 14 wherein:
the specific-thrust is less than 100 N/Kg/s; and
the ratio of the radius of the position where the leading edge of one of the fan blades meets the hub to the outermost radial extent of the leading edge of the fan blade is less than 0.33.

20. The gas turbine engine according to claim 15 wherein:
the specific thrust is less than 100 N/Kg/s; and
the ratio of the radius of the position where the leading edge of one of the fan blades meets the hub to the outermost radial extent of the leading edge of the fan blade is less than 0.33.

\* \* \* \* \*